March 17, 1964 H. J. RICHGELS 3,125,119
SLURRY AGITATOR VALVE
Filed June 15, 1960
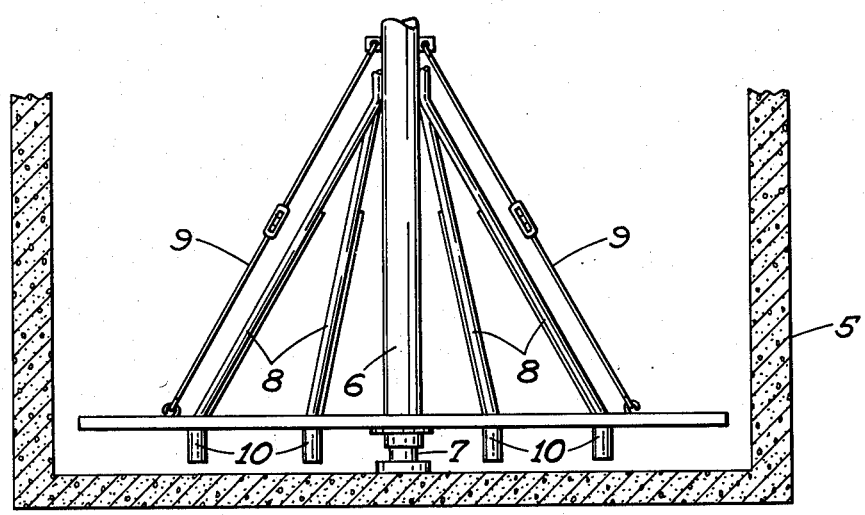
Fig 1
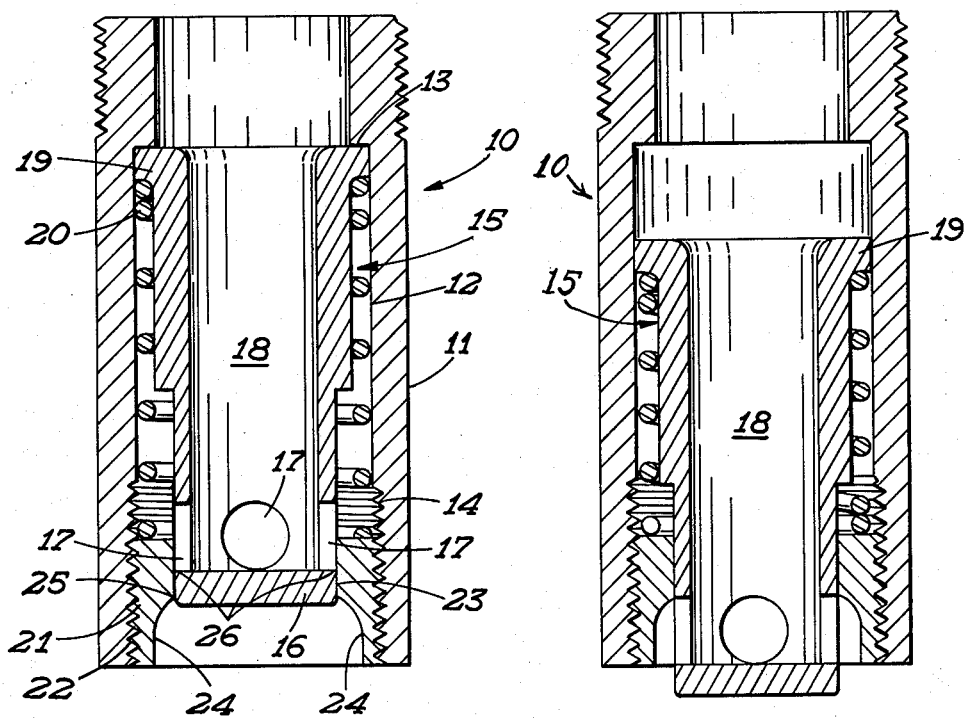
Fig 2
Fig 3
INVENTOR.
HARRY J. RICHGELS
BY Everett J. Schroeder
ATTORNEY

United States Patent Office 3,125,119
Patented Mar. 17, 1964

3,125,119
SLURRY AGITATOR VALVE
Harry J. Richgels, Manitowoc, Wis., assignor to Lakeside Machine Shop, Inc., Manitowoc, Wis., a corporation of Wisconsin
Filed June 15, 1960, Ser. No. 36,323
1 Claim. (Cl. 137—538)

This invention relates to slurry tanks and devices for agitating the content thereof. More particularly it relates to agitator valves used on the discharge end of compressed air conduits to intermittently release compressed air within the slurry to thereby agitate and mix the slurry.

During one phase of the manfacture of cement there are large tanks filled with "slurry" which must be constantly stirred and agitated. These tanks are crossed by a steel framework from which is suspended a conically shaped arrangement of pipes which, together with the gearing used to turn it, is known as the agitator. The pipes normally reach almost to the floor of the tank and their discharge terminals are disposed in such a manner that as they revolve, each pipe describes a circle of a different diameter. As they revolve, air is then blown through these pipes one at a time at regular intervals, and the length of the blowing time is regulated by an air distributor valve built into the agitator. Hence, one pipe may blow through sixty to seventy five degrees of its circular path and the air is shut off from that pipe and conducted into another pipe during the remainder of its revolution. Each of the pipes has air introduced into it at intervals until all of the pipes have been blown and then another cycle is started.

The above method of mixing is well known and continues for many hours until the mixing is complete and the slurry is drawn off for other phases of manufacture. The constant agitation is necessary in order to prevent solids from settling out and solidifying in the tank.

In order to prevent the slurry from entering the discharge terminal of the compressed air pipe when the air is shut off, a valve is attached to the discharge end of the pipe. Valves of various types as well as rubber sleeves have been tried but to the best of my knowledge, none of these valves have proved totally satisfactory.

The most commonly experienced disadvantage of the valves is that after a few weeks the interior of the pipes become coated or filled with hardened slurry after which time the pipes must be dismantled and beaten in order to jar and loosen the hardened material and remove the same. After having been so beaten, the pipes may be reassembled and again used for the same purpose. The resultant labor costs and the lost production involved during the period while the pipes are being dismantled, beaten and reassembled, however, increases the production cost of the cement to such an extent that it is almost prohibitive. Manufacturers have also attempted to utilize large compressors and continuously blow compressed air through all of the pipes in order to avoid the entrance of the slurry into the discharge terminal of the pipes when the air is shut off. The cost of utilizing such larger compressors in this manner, however, has proved to be prohibitive. My invention is directed to eliminating this problem by providing a valve which closes instantly when the air is shut off and is constructed in such a manner as to prevent any slurry from entering the interior of the compressed air pipe.

It is a general object of my invention to provide a novel and improved slurry agitator valve of simple and inexpensive construction and operation.

A more specific object of my invention is to provide a novel and improved slurry agitator valve inexpensively constructed and functioning in such a manner as to preclude the entrance of slurry into the interior of the pipes when the source of compressed air is cut off from the pipes.

Another object is to provide a novel and improved slurry agitator valve which is constructed in such a manner as to provide shearing surfaces which close while air is being continuously discharged from the valve, to thereby preclude the entrance of slurry into the interior of the compressed air pipes.

Another object is to provide a novel and improved slurry agitator valve which may be repeatedly opened and closed in accordance with the pressure of the air within the air pipes without slurry gaining entrance to the interior of the valve and pipes with consequent need for dismantling and time-consuming interruptions subsequently.

Another object is to provide a novel and improved slurry agitator valve which will automatically open when the source of compressed air is connected to the interior of its associated air pipe and will automatically close when such compressed air is cut off, the opening and closing being accomplished without permitting any of the slurry to enter the valve or the air pipe.

These and other objects and advantages of my invention will more fully appear from the following description, made in connection with the accompanying drawings, wherein like reference characters refer to the same or similar parts throughout the several views, and in which:

FIG. 1 is a partial side elevational view of a combined mechanical and air agitating device commonly in use;

FIG. 2 is a vertical sectional view on an enlarged scale of one of my slurry agitator valve in closed position; and FIG. 3 is a vertical sectional view on an enlarged scale of the same agitator valve in open position.

Mechanical agitators have been used in the manufacture of cement previously, but operators know from experience that their first cost and the cost of their operation is high. Pneumatic agitators using compressed air along with various arrangements have also been used. However, the most efficient agitator design employs what may be termed "combined mechanical and air agitation." It is this type of agitator which has been shown in the drawings herein. The aim in the designing of proper agitating equipment should be to use air as economically as possible with entire freedom from operating difficulties. These operating difficulties consist of keeping the air pipes from plugging and consequent need for dismantling and cleaning of the interior of the pipes. The agitation accomplished by the air is to a large extent the same as that accomplished by mechanical agitation but in a much more efficient manner.

My new agitator valve is designed to be coupled to the lower end of the air pipes shown in FIG. 1 as illustrated so that the discharge thereof will be directed downwardly against the bottom of the slurry tank. Shown partially in FIG. 1 is a slurry tank 5 which has a spindle 6 mounted within a bearing 7 and extending upwardly from the bottom of the tank at the center thereof. A plurality of air pipes 8 are connected at their upper end to a distributor valve (not shown) which in turn is connected to a source of compressed air (also not shown). The spindle 6 is also connected connected to drive mechanism at its upper end which serves to rotate the spindle and the pipes 8 associated therewith. It will be noted that the air pipes 8 terminate at various radii relative to the spindle 6. The conventional distributor valve alternately injects compressed air into first one of the pipes 8 and then the other as the pipes rotate with the spindle 6 and in this manner, compressed air is ejected to the different pipes during different portions of their orbit. Tie rods 9 aid in supporting the air pipes 8.

My new slurry agitator valve, which is identified generally by the number 10, is preferably formed of a tubular member or housing 11 which is externally threaded at its upper end for connection to the lower end of the air pipe 8. The lower end portion of the tubular member 11 is counter-bored as at 12 to form an abutment shoulder 13 at the upper end of the counter-bore. The extreme lower end portion of the tubular member 11 is internally threaded as at 14.

Mounted within the counter-bore of the tubular member 11 is a hollow cylinder core 15 which constitutes a valve element. This valve element 15 has a lower end closed by an end wall 16 and a plurality of ports 17 extending through the side walls thereof immediately above its closed end wall 16. The hollow interior 18 of the valve element 15 communicates with the bore of the air pipe 8 when the valve element 10 is connected thereto and, when the valve element is in open position, also communicates with the discharge of the tubular member 10. It will be noted that the valve element 15 has a radially outwardly extending flange 19 which serves as a stop and engages the shoulder 13 of the tubular member 10 when the valve element moves to closed position.

Encircling the generally cylindrical valve element 15 is a coiled compression type spring 20 the upper end of which bears against the flange 19 and the lower end of which bears against the upper end of a collar member 21. This collar member 21 is tubular in form and is externally threaded as at 22. The collar member 21 is threaded into the threads 14 of the tubular member 11 and the bore thereof provides a valve seat 23 for the valve element 15. This collar member 21 is also counter-bored to provide gas directing walls 24 which are concaved longitudinally of the collar member and extend parallel to the axis of the bore of the tubular member 11. These gas directing walls 24 terminate in a relatively sharp cutting edge 25. Thus the collar member 21 has a shearing surface 25 which cooperates with the shearing surface at the lower edge of the ports 17 as at 26.

The operation of a combined mechanical and compressed air agitator such as is shown in FIG. 1, when provided with agitator valves of the type disclosed and claimed herein may continue for substantially greater periods than has heretofore been possible with valves previously known. For example, a type of valve commonly used is one wherein a ball is floated upwardly by the slurry against a seat. In actual practice, this ball does not always float up evenly due to the turbulence of the slurry rushing into the chamber when the air is shut off and small amounts of slurry will coat the seat of the valve. Furthermore, the ball may revolve during further openings and closings, and as the ball is coated it also puts further deposits on the valve seat and nodules begin to form on the seat. Henceforth such a ball will not be able to seat properly and slurry will leak back into the pipes with the consequent disadvantages heretofore pointed out.

When the air pipes 8 are provided with agitator valves of the type disclosed and claimed herein, slurry is precluded from entering the air pipes 8. As the spindle and supporting arms 9 slowly revolve, air is forced down through the pipes 8 one at a time and is emitted by the valve. When the air pressure within the pipes 8 has built up to the extent necessary to overcome the combined tension of the spring 20 surrounding the valve element 15 and the density of the slurry mixture pressing on the bottom of the valve element, then the valve core 15 begins to move downwardly until the full round ports 17 in the wall of the valve element pass the upper edge 25 of the concaved walls 24. As soon as the ports 17 pass this edge 25 air will being to emit and be directed downwardly against the bottom of the tank by the walls 24. The valve element 15 will continue to move to the wide open position and the escaping air is directed downwardly by the concaved walls 24 to blast the material loose from the floor of the tank.

Rising upwardly through the slurry mixture, the compressed air creates a boiling action or turbulence which mixes the components of the slurry and keeps them in suspension and in the desired fluid state.

When the air pressure is shut off from a particular pipe 8, the valve associated therewith will commence to close and the action of the valve element 15 is reversed. As the pressure is reduced, the spring tension on the valve element 15 begins to lift the core upwardly, but the compressed air continues to blow through the ports 17 until the lower edges thereof have cleared the upper edge 25 of the walls 24. In other words, air will continue to emit until the cooperating shearing surfaces commence to pass each other. Air will continue to be blown through the ports 17 until the lower edge of the port has cleared the edge 25. The spring tension plus the pressure on the bottom of the core from the slurry continues to close the valve to a completely closed position and any slurry adhering to the core or valve element 15 is sheared off by the edge 25.

It will be noted that the air flows through my valve element until the last split second when the valve is closing thereby preventing the entry of any slurry into the interior of the pipes 8 and into the interior of the valve 10. As a result, a combined mechanical and air agitation mixer such as is shown in FIG. 1 may be used for greatly prolonged periods when equipped with valves of the type disclosed and claimed herein as compared to when valves of the type heretofore known are used. This results in a substantial saving in labor and in an even greater saving in that production can be maintained. When valves of the type described herein are utilized, extremely costly delays in production are eliminated.

It will, of course, be understood that various changes may be made in the form, details, arrangement and proportions of the parts without departing from the scope of my invention herein and in the appended claim.

What is claimed is:

A slurry agitator valve comprising a tubular housing having open upper and lower ends and cylindrical inner and outer surfaces each of constant diameter, an annular stop flange secured to said housing at its upper end and projecting radially inwardly from its inner surface, a tubular valve member within said housing having an upper cylindrical outer surface and a lower cylindrical outer surface smaller in diameter than said upper cylindrical outer surface, a radial shoulder connecting said cylindrical surfaces of said valve member, an upper flange integrally formed on the upper end of said upper cylindrical surface and projecting radially outwardly therefrom, said upper flange slidably engaging the inner surface of said housing below said stop flange and spacing said upper and lower cylindrical surfaces from said inner surface of said housing so as to form an annular chamber, threads formed within the lower end of said housing, a ring shaped valve seat threaded into said lower end of said housing, said valve seat having an inner cylindrical surface slidably receiving said lower cylindrical surface of said tubular member, a wall closing the lower end of said tubular member and said tubular member having ports extending radially therethrough directly above said wall, a coil spring in said annular chamber compressed between said seat and upper flange so as to urge said upper flange upwardly into abutting engagement with said stop flange, said radial shoulder adapted to engage said valve seat so as to limit downward movement of said tubular member and compression of said coil spring, the lower inner surface of said valve seat being formed with a recess defined by a lower cylindrical surface coaxial with said housing and a curved dome shaped surface merging with said lower cylindrical surface and intersecting the inner cylindrical surface of said valve seat so as to define a sharp circular shearing edge, said dome shaped surface adapted without causing turbulence to gradually change movement of gases flowing through said ports from a radial direction to an axial direction relative to said tubular housing when said valve is open, and said wall sealing said chamber from said recess when said spring urges said upper flange into engagement with said stop flange.

References Cited in the file of this patent

UNITED STATES PATENTS

| | | |
|---|---|---|
| 74,469 | Williams et al. | Feb. 11, 1868 |
| 812,460 | Smith et al. | Feb. 13, 1906 |
| 1,704,013 | Minogue | Mar. 5, 1929 |
| 2,206,356 | Hutchings | July 2, 1940 |
| 2,319,021 | Van Nest | May 11, 1943 |
| 2,359,025 | Durdin | Sept. 26, 1944 |
| 2,530,091 | Smith | Nov. 14, 1950 |
| 2,928,417 | Buckner | Mar. 15, 1960 |

FOREIGN PATENTS

| | | |
|---|---|---|
| 1,078,663 | France | May 12, 1954 |